United States Patent [19]

Organek et al.

[11] Patent Number: 5,819,883
[45] Date of Patent: Oct. 13, 1998

[54] DRIVELINE RETARDER WITH BALL RAMP LOADED FRICTION PLATES

[75] Inventors: Gregory J. Organek, Livonia; David M. Preston, Clarkston, both of Mich.

[73] Assignee: Eaton Corporation, Cleveland, Ohio

[21] Appl. No.: 892,615

[22] Filed: Jul. 14, 1997

Related U.S. Application Data

[63] Continuation of Ser. No. 609,206, Mar. 1, 1996, abandoned.

[51] Int. Cl.$^6$ ..................................................... F16D 55/36
[52] U.S. Cl. ................. 188/71.5; 192/56.43; 192/70.23; 192/84.93
[58] Field of Search ................................... 192/35, 54.52, 192/56.3, 56.4, 56.43, 56.57, 70.23, 83, 84 B, 84.93; 188/71.3, 71.5, 71.6, 156, 161, 163, 264 B, 264 D, 264 E, 264 F, 72.7

[56] References Cited

U.S. PATENT DOCUMENTS

| | | | |
|---|---|---|---|
| 2,937,729 | 5/1960 | Sperr, Jr. .............................. | 192/84.93 |
| 2,956,649 | 10/1960 | Kelley ..................................... | 188/71.6 |
| 3,088,552 | 5/1963 | Christenson et al. .............. | 188/71.5 X |
| 3,313,381 | 4/1967 | Harting et al. ......................... | 188/71.5 |
| 4,352,415 | 10/1982 | Powell .................................... | 188/156 |

Primary Examiner—Robert J. Oberleitner
Assistant Examiner—Pamela J. Lipka
Attorney, Agent, or Firm—Loren H. Uthoff, Jr.; Howard D. Gordon

[57] ABSTRACT

A driveline retarder coupled to a vehicle driveline where a ball ramp actuator having a control plate and an activation plate separated by rolling elements is energized by an electrical coil is used to apply a clamping load on a clutch pack which frictionally couples a rotating shaft to a gerotor hydraulic pump which is used to absorb rotational energy to create a braking torque on the vehicle driveline to aid in vehicle braking. A coupling plate is electromagnetically attracted to the electrical coil thereby transferring a braking torque to the control plate through a flex plate.

8 Claims, 2 Drawing Sheets

DRIVELINE RETARDER WITH BALL RAMP LOADED FRICTION PLATES

This application is a continuation of application Ser. No. 08/609,206, filed Mar. 1, 1996, now abandoned.

BACKGROUND OF THE INVENTION

1. Field of the Invention

The present invention relates to a driveline retarder for a motor vehicle. More specifically, the present invention relates to a driveline retarder for a motor vehicle where a ball ramp actuator is used to load a clutch pack.

2. Description of the Prior Art

It has been recognized that there is a need in the operation of heavy duty trucks for increased braking performance and safety and longer life of the wheel brake linings. When a large, fully loaded semi-trailer (which weighs about 80,000 pounds) descends a 60 percent downgrade at highway speeds for one or two miles, some form of braking other than the truck's own service brakes are generally required to avoid loss of control. While foundation brakes can apply enough torque to skid the wheels initially, their effectiveness increases rapidly as they absorb energy and heat up causing fade.

In the past, coil type electromagnetic retarders and hydro-dynamic retarders have been used on vehicle drivelines to supplement engine and direct wheel braking. Various types of coupling devices have been used to rotationally join the retarder to the driveline. Braking energy converters are known by the general term "retarder". Some retarders operate according to the hydro-dynamic turban-pump principle with a built-in cooling water/oil cooler. However, dissipation of the braking energy is commonly done through the vehicle own's cooling system. This severely limits the retarder performance, complicates the installation and makes these systems more expensive than other alternatives. Also known in the art are electromagnetic eddy current brakes, which necessarily have a very heavy design, as required fan disks constantly consume power. Finally, there are hydro-dynamic torque converters, which are arranged in front of the power shift gear in vehicles, and were modified to function as retarders of the kind described above using relatively complex technology.

Another type of retarder uses the loading of a clutch pack using mechanical, hydraulic or pneumatic actuators to directly supply the clamping load. These methods of loading the clutch pack have proven to be large and complicated leading to packaging and/or reliability problems. Also, complicated control systems are required to properly regulate the clamping force.

SUMMARY OF THE INVENTION

The present invention provides for the braking and subsequent slowing of the rotation of a vehicle driveline by means of a retarder having a clutch pack comprised of a plurality of clutch friction plates which are clamped together by means of a ball ramp actuator. The degree of activation of the ball ramp actuator, and hence, the clutch pack, is controlled by a coil which electromagnetically pulls an armature into frictional contact with the coil housing thereby providing a braking torque to the control ring of the ball ramp actuator. The ball ramp actuator expands in its axial dimension when such a braking force is applied to the control ring which causes a clamping force to be applied to the clutch pack thereby retarding the rotational speed of the vehicle driveline to assist the foundation braking system in slowing the vehicle.

A detailed disclosure of the construction and operation of a ball ramp actuator can be found in U.S. Pat. Nos. 2,091,270; 2,605,877; 2,649,941; 3,000,479 and 5,372,106, the disclosures of which are hereby incorporated by reference. The response time of the ball ramp actuator is quite rapid and the actuator has the unique characteristic of generating a very high axial force compared to the braking force applied to the control ring, typically in a ratio of 50:1. The clutch pack is made up of a plurality of clutch stationary friction plates grounded to the housing and a like number of clutch rotating friction plates adapted to rotate with an output shaft of the vehicle driveline such as a transmission which combine to apply a frictional rotational retarding torque to the spinning transmission output shaft to further slow the vehicle in assistance to the foundation braking system.

The present invention makes use of a ball ramp actuator to apply a clamping force to a plurality of stationary rotating friction plates thereby providing a retarding force to a rotating driveline shaft, typically the output shaft of a vehicle transmission. The friction plates are immersed in an oil bath where the oil is cooled by the use of a pump such as a gerotor pump thereby cooling the oil and providing for dissipation of the frictional energy generated as the friction plates are loaded by the ball ramp actuator and absorb rotational energy from the driveline transmission output shaft. The gerotor pump transfers fluid from the ball ramp actuator and clutch pack to a heat exchanger where the frictional energy heating of the oil is dissipated into the atmosphere.

One provision of the present invention is to provide an improved vehicle driveline retarder.

Another provision of the present invention is to provide an improved vehicle driveline retarder using a ball ramp actuator to load a clutch pack.

Another provision of the present invention is to provide an improved vehicle driveline retarder using a ball ramp actuator to load a clutch pack where an electromagnetic coil is used to apply a retarding force to a control ring.

Another provision of the present invention is to improve a vehicle driveline retarder using a ball ramp actuator to load a clutch pack to slow the driveline of a vehicle where a gerotor pump is used to circulate the oil bath.

Another provision of the present invention is to improve a vehicle driveline retarder using a ball ramp actuator to load a clutch pack where one side of the clutch pack is grounded and a second side is connected to the vehicle driveline.

Still another provision of the present invention is to provide an improved vehicle driveline retarder using a ball ramp actuator to load a clutch pack where one side of the clutch pack is grounded and a second side of the clutch pack drives an energy absorption device.

DETAILED DESCRIPTION OF THE PREFERRED EMBODIMENT

Figure 1:
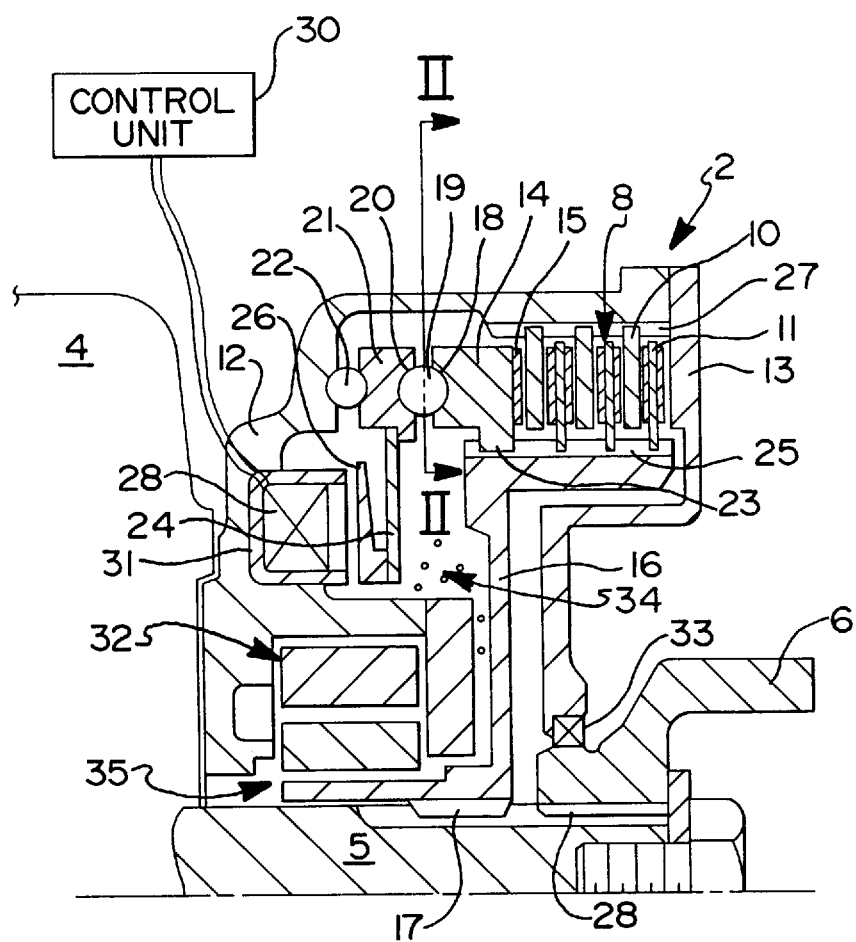
FIG. 1 is a cross-sectional view of the vehicle driveline retarder of the present invention.

For purposes of promoting the understanding of the principles of the invention, reference will now be made to the embodiment illustrated in the drawings and specific language will be used to describe the same. It will nevertheless be understood that limitation of the scope of the invention is thereby intended, such alterations and further modifications in the illustrated device, and further applications of the principles of the invention as illustrated therein being contemplated as would normally occur to one skilled in the art to which the invention relates.

In this disclosure, certain terminology will be used in the following description for convenience in reference only and will not be limiting. For example, the terms "forward" and "rearward" will refer to directions forward and rearward of the retarder as installed on the shaft portion of a driveline transmission. The terms "rightward" and "leftward" will refer to directions in the drawings in connection with which the terminology is used. The terms "inwardly" and "outwardly" will refer to directions toward and away from, respectively, the geometric center of the retarder of the present invention. The terms "upward" and "downward" will refer to directions as taken in the drawings in connection with which the terminology is used. All foregoing terms mentioned above include the normal derivatives and equivalents thereof.

Now referring to FIG. 1 of the drawings, a cross-sectional view of the retarder assembly 2 of the present invention is shown mounted to the rearward portion of the transmission case 4 of a vehicle driveline. The retarder assembly 2 of the present invention is shown attached to the rear of the transmission case 4 having a rotating output shaft 5 where it is desirable to apply a retarding force to the rotating output shaft 5 to slow the vehicle at the appropriate time. The rotating output shaft 5 is linked to the balance of the vehicle driveline by the yoke output 6 which is traditionally nonrotatably connected to a driveshaft which extends rearward to the differential (not shown).

The ball ramp actuator 7 of the present invention is linked mechanically to both the transmission case 4 and the rotating output shaft 5 such that activation of the ball ramp actuator 7 results in a frictional coupling from the stationary transmission case 4 to the output shaft 5 through a plurality of friction plates which make up the clutch pack 8. The clutch pack 8 is comprised of alternated stationary friction plates 10 and drive friction plates 11 which when pressed together frictionally couple the stationary friction plates 10 to the drive friction plates 11 allowing a degree of slip depending on the clamping force applied by the ball ramp actuator 7.

Both the stationary friction plates 10 and the drive friction plates 11 are circular in shape and splined with teeth which extend radially inward to engage the inner housing 12 and the transfer ring 16 respectively. A friction surface 15 is bonded to the activation plate 14 so as to frictionally engage one of the stationary friction plates 10. The activation plate 14 is connected by spline 23 to nonrotatably engage the transfer ring 16 which in turn is nonrotatably linked to the output shaft 5 by spline 17.

The activation plate 14 has at least three ramp grooves 18 formed in the face of the activation plate 14 opposite to the face holding the friction surface 15. A like number of rolling elements 19 engage respective ramp grooves 18 where the ramp grooves 18 vary in depth along their length. The rolling elements 19 likewise engage matched opposing ramp grooves 20 formed in a control plate 21. The ramp grooves 18 and 20 are formed and orientated such that relative rotational motion between the activation plate 14 and the control plate 21 results in relative axial displacement between the activation plate 14 and the control plate 21 thereby producing an axial force. Supporting the control plate 21 on the face opposite the face containing the ramp grooves 20 is a thrust bearing 22 which axially locates the control plate 21 in a fixed axial position relative to the inner housing 12 while allowing rotation of the control plate 21. Thus, the thrust bearing 22 contains the axial forces generated when the ball ramp actuator 7 is activated and axially expands to apply a clamping load to the clutch pack 8.

Extending inwardly from the control plate 21 and attached thereto is the flex plate 24 which is axially flexible to provide for axial displacement of the coupling plate 26. The coupling plate 26 is adjacent to a coil 28 which is electrically energized by the control unit 30 when it is desired to activate the ball ramp actuator 7. When the coil 28 is electrically energized, an electromagnetic field is formed in the coil housing 30 which electromagnetically attracts the coupling plate 26 thereby introducing a retarding torque on the control plate 21 assuming the output shaft 5 is rotating. This results in rotation of the transfer ring 16 through spline 17, the activation plate 14 through spline 23, the rolling elements 19 through ramp grooves 20 and the control plate 21 through ramp grooves 20 and rolling elements 19. The retarding torque introduced into the control plate 21 causes a limited relative rotation between the control plate 21 and the activation plate 14 such that the rolling elements 19 ride up the ramp grooves 18 and 20, thereby axially displacing the activation plate 14 rightward to supply a clamping load on the clutch pack 8. The clamping load on the clutch pack 8 causes the inner housing 12 to be frictionally linked to the transfer ring 16 which is nonrotatably linked to the output shaft 5 by spline 17. Thus, a significant retarding force is applied from the transmission case 4 through the inner case 12 through the clutch pack 8 through the transfer ring 16 to the rotating output shaft 5 which serves to retard the rotation of the output shaft 5. An outer housing 13 is secured to the inner housing 12 and supports the retarder assembly 2 supported by bearing 33 which rides on a surface formed on the yoke output 6.

The frictional elements of the ball ramp actuator 7 of the present invention operate in oil where the oil temperature is raised through frictional heating of the oil especially by the clutch pack 8 as the retarder assembly 2 is activated. To prevent over-temperature of the oil 34 a circulation pump 32 is used to transfer the oil 34 from the retarder assembly 2 to a heat exchanger (not shown) which then transfers the heat to the atmosphere. In this manner, the frictional heat generated by the clutch pack 8 is dissipated by this oil 34 circulation and cooling system to prevent damage due to over heating of the unit.

Figure 2:
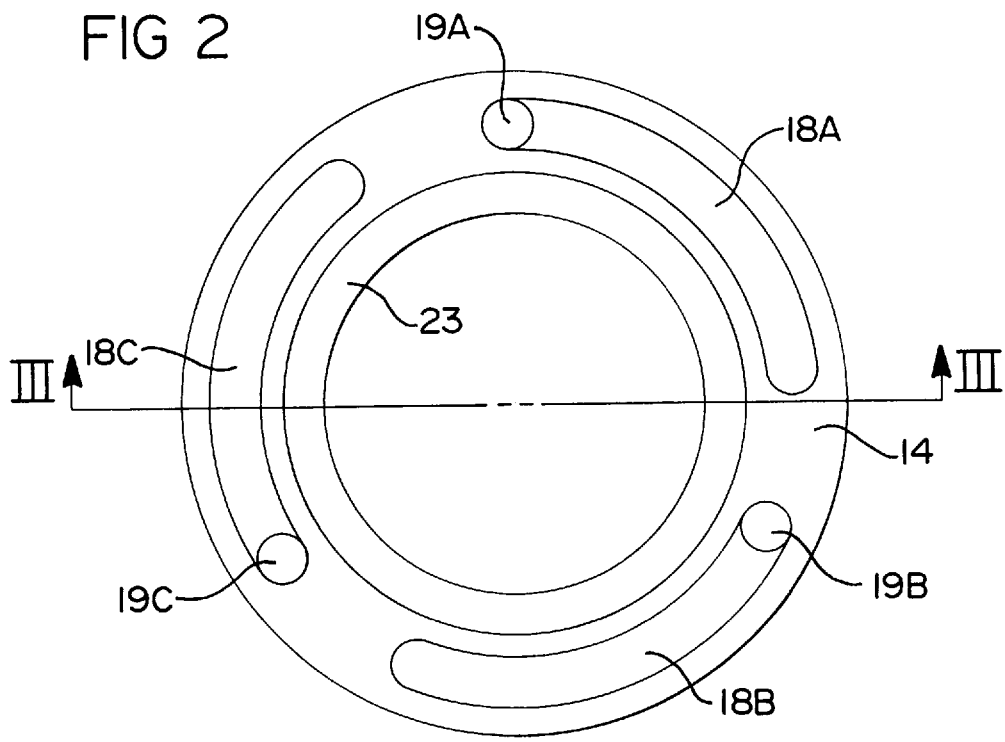
FIG. 2 is a cross-sectional view of the ball ramp actuator of the present invention taken along line II—II of FIG. 1.

Now referring to FIG. 2, a cross-sectional view of the ball ramp actuator 7 of the present invention is shown taken along line II—II of FIG. 1. Although any number of ramp grooves 19 could be utilized, three ramp grooves are shown formed in the face of the activation plate 14 specifically as ramp grooves 18A, 18B and 18C. Riding in their respective ramp grooves are rolling elements 19A, 19B and 19C which are typically balls, but could also be cylinders or any other appropriate rolling shape. The depths of the ramp grooves 18A, 18B and 18C vary in depth along their length such that when the rolling elements 19A, 19B and 19C transverse their respective ramp grooves 18A, 18B and 18C, the height of the rolling element above the face of the activation plate 14 is increased or decreased according to their location in the groove 18.

Figure 3:
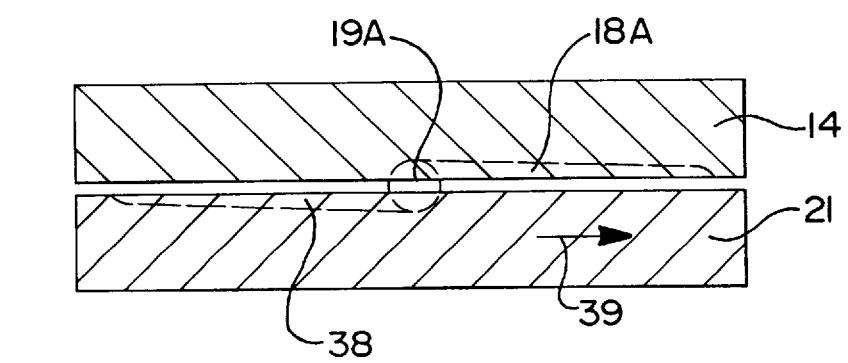
FIG. 3 is a elevational view of the ball ramp actuator of the present invention.

The operation of the ball ramp actuator 7 is more clearly illustrated in reference to FIG. 3 which is a top view of the activation plate 14 and the control plate 21 with a rolling element 19A separating the two on the ramp grooves 18 and 20. Only one rolling element 19A is shown for clarity, the other two rolling elements 19B and 19C simultaneously acting in a similar manner.

The activation plate 14 is shown axially spaced from the control plate 21 by the rolling member 19A contacting the ramp groove 18A and ramp groove 20A. When the coil 28 is electrically energized by the control unit 30, the coupling plate 26 is magnetically attracted to the coil housing 30 which supplies the retarding torque to the control plate 21 which causes relative rotational motion of the activation plate 14 and the control plate 21. The control plate 21 rotates relative to the activation plate 14 in the direction shown by the arrow 39 in FIG. 3. Relative rotation between the control plate 21 and the activation plate 14 results in the rolling member 19A traversing the ramp grooves 18A and 20A thereby increasing the separation between the activation plate 14 and the control plate 21. Increase in the axial separation distance between the activation plate 14 and the control plate 21 results in a clamping force being applied to the clutch pack 8 which forces the stationary friction plates 10 against the drive friction plates 11 thereby frictionally linking the inner housing 12 and the outer housing 13 (which are grounded to the transmission housing 4) to the output shaft 5 through the transfer ring 16. Slippage in the clutch pack 8 occurs which heats the oil 34 which is cooled by transfer to the heat exchanger (not shown) with pump 32. Relative rotation of the activation plate 14 and the control plate in an opposite direction to that shown by the arrow 39 causes the clamping force on the clutch pack 8 to be reduced thereby allowing the output shaft 5 to increase the rate of rotation relative to the transmission case 4.

Although the present invention has been described in its preferred form with a certain degree of particularity, it is understood that the present disclosure of the preferred embodiment has been made only by way of example, and that numerous changes in the detail construction and combination and arrangement of the parts may be resorted to without departing from the spirit and the scope of the invention as hereinafter claimed.

We claim:

1. A driveline mounted at the output shaft of a transmission retarder for braking the rotation of a vehicle driveline comprising:

a vehicle driveline;

a housing having a cavity therein, said housing attached to a transmission case;

a clutch pack having a plurality of stationary friction plates nonrotatably connected to said housing and a plurality of drive friction plates nonrotatably connected to said vehicle driveline, said stationary friction plates and said drive friction plates disposed to frictionally link said vehicle driveline to said housing when a clamping load is applied to said clutch pack;

a ball ramp actuator for applying a clamping load on said clutch pack comprising: an activation plate adjacent to said clutch pack where axial movement of said activation plate results in a loading and an unloading of said clutch pack; a control plate disposed adjacent to said activation plate, said control plate and said activation plate having opposed faces provided with circumferentially extending grooves, said grooves as at least three opposed pairs of grooves having portions of varying depth having a maximum depth at one end and a minimum depth at an opposite end rolling members disposed one in each opposed pair of grooves, said grooves on said activation plate and said control plate being arranged so that relative angular movement of said activation plate and said control plate from a starting position thereof causes axial movement of said activation plate away from said control plate to axially load said clutch pack;

a transferring ring rotationally connecting said activation plate to said driveline;

a coupling plate coupled to said control plate, said coupling plate having a friction surface on a face thereof;

an electrical coil wound adjacent to a coil housing, said coil being electrically energized by a control unit whereupon said coupling plate is electromagnetically attracted into contact with said coil housing and frictionally coupled therewith to said housing (12) to provide a rotational retarding torque on said control plate.

2. The driveline retarder of claim 1, further comprising an oil circulation and cooling system where oil surrounds the clutch pack and a pump contained within said housing circulates said oil to a heat exchanger.

3. The driveline retarder of claim 2, wherein said oil pump is a gerotor pump.

4. The driveline retarder of claim 1, wherein said friction plate is coupled to said control plate with a flex plate thereby allowing said friction plate to move axially to contact said coil housing when said coil is energized.

5. The driveline retarder of claim 1, wherein said rolling members are spherical in shape.

6. The driveline retarder of claim 1, further comprising a thrust bearing disposed between said housing and said control plate for absorbing thrust loads.

7. The driveline retarder of claim 1, wherein said drive friction plates are positioned in an alternating configuration with said stationary friction plates.

8. The driveline retarder of claim 1, wherein said drive friction plates have a front surface and a back surface both covered by a friction material where said friction material contacts said stationary friction plate.

* * * * *